May 1, 1962 L. NAMENYI-KATZ 3,032,287

MAGNETIC TAPE RECORDERS

Filed Oct. 29, 1959 2 Sheets-Sheet 1

Inventor
L. Namenyi-Katz
By Glascock Downing & Seebold
Attys.

MAGNETIC TAPE RECORDERS

Filed Oct. 29, 1959 2 Sheets-Sheet 2

Inventor
L. Namenyi-Katz
By Glascock Downing & Seebold
Attys.

3,032,287
Patented May 1, 1962

3,032,287

MAGNETIC TAPE RECORDERS

Laszlo Namenyi-Katz, Bedfont, Feltham, England, assignor to Epsylon Research and Development Company Limited, Bedfont, Feltham, England Filed Oct. 29, 1959, Ser. No. 849,658
Claims priority, application Great Britain Nov. 4, 1958
3 Claims. (Cl. 242—55.17)

This invention relates to magnetic tape recorders and reproducers and more particularly to a type of tape recorder for use with magnetic tape in the form of an endless band.

It is already known from my co-pending United States Patent Application Serial No. 697,078, filed November 18, 1957, to use magnetic tape in the form of an endless band, the tape being wound on a reel comprising a flange portion and having two pins or rollers projecting from the face of the flange, and normal thereto. The endless band of tape is hooked over one of the pins or rollers and is wound up by rotating the reel. To use the tape the reel is attached to the tape recorder and a loop of the tape is passed into a magazine through two openings in different parts of the wall thereof. The tape is then transferred to the magazine by means of two capstans with co-operating pinch-rollers which feed the tape through the two openings simultaneously as it unwinds from the reel. The magazine is of sufficient size to accommodate the whole of the length of tape, except for a loop which remains outside, in the form of loose meandering loops. When the whole length of tape has been unwound recording or playback may commence.

For recording or playback the direction of rotation of one capstan is reversed and a brake is applied to the reel. The one capstan draws tape from the magazine and the other capstan draws the tape round one of the pins or rollers on the reel, past a magnetic recording or reproducing head, and feeds it back into the magazine.

To remove the band of tape from the recorder the two capstans are rotated in the direction opposite to that used for filling the magazine, so that they both withdraw tape, and the reel is rotated to wind the band up in a double spiral. Finally the loop of tape in the magazine is released and the reel is removed with the wound band.

This arrangement, while very suitable for many purposes, requires a special type of tape reel for each band of tape and two capstans. Both capstans must be reversible independently and means must be provided to enable one capstan to run at a speed slightly different from that of the other, at any rate during reeling and unreeling, to prevent the formation of a loose loop of tape. If unreasonable loss of time is to be avoided the two capstans must be arranged to run at low speed for recording and playback and at high speed for reeling and unreeling. Even so, there is some delay when a new reel of tape is fitted whilst the magazine is being loaded before recording or playback can commence.

One object of the present invention is to provide a tape recorder for use with a magnetic tape in the form of an endless band which is of simple construction and is very suitable for use as a pocket tape recorder.

A further object is to provide a tape recorder in which an endless band of tape wound into a coil is placed loosely in a magazine, a loop of the tape being brought to the outside of the magazine from two spaced openings in the wall thereof. With this arrangement the coil is unwound inside the magazine while recording or playback is in progress. Furthermore, no reel is required to carry the tape. A rewinding device arranged for manual operation may be disposed outside the magazine to enable tape to be wound up in a double spiral into a coil which may then be removed from the rewinding device. Accordingly it is a further object of the invention to provide a tape recorder without motor driven tape rewinding devices.

It is another object of the invention to provide a hand-operated rewinding device by which the tape may be rewound and removed from the tape recorder, as a coil which does not require a spool to carry it. It is a still further object of the invention to provide in such a tape rewinding device a stripper by which a wound coil of tape may easily be removed.

Still a further object is to provide a compact tape recorder suitable for use as a pocket recorder which may be carried in the same way as a conventional hearing aid.

The invention consists of a tape recorder for use with magnetic tape in the form of an endless band wound in a double spiral into a coil, comprising a magazine having two spaced openings in its side through which a loop of the tape is brought to the outside of the magazine, a magnetic head, and a capstan adapted to draw tape from one opening of the magazine past the magnetic head and to feed it back through the other opening of the magazine.

The capstan may be provided with a pinch roller, or a pressure pad made of material having a low co-efficient of friction, to maintain the tape in frictional contact with the capstan. The magnetic head may be provided with a co-operating pressure pad to maintain the tape in contact therewith. Means may be provided adjacent the opening from which the tape issues from the magazine to produce a desired tension in the tape during its passage past the recording head.

A rewinding device for rewinding the tape may comprise a circular flange manually rotatable about its axis, two pins projecting from the face of the flange and normal thereto. Conveniently a latch may be associated with the rewinding device for locking it in a desired position during recording or playback. The rewinding device may be locked in such a position as to produce frictionally the desired tension in the tape.

A stripper for the rewinding device may consist of a disc normally lying against the face of the flange and movable therefrom in the axial direction to remove a coil of tape wound around the pins. Preferably the stripper consists of a circular plate whose diameter is the same as that of the flange, guide means being provided to constrain the plate to move in the desired direction. A spring or its equivalent may be provided to urge the stripper against the face of the flange.

Conveniently a knob is provided by means of which the rewinding device may be rotated and a push button may be incorporated in the knob by means of which the stripper may be moved in the axial direction.

In order that the invention may be more fully understood one embodiment of it will now be described by way of example with reference to the accompanying drawings, of which:

Figure 1:
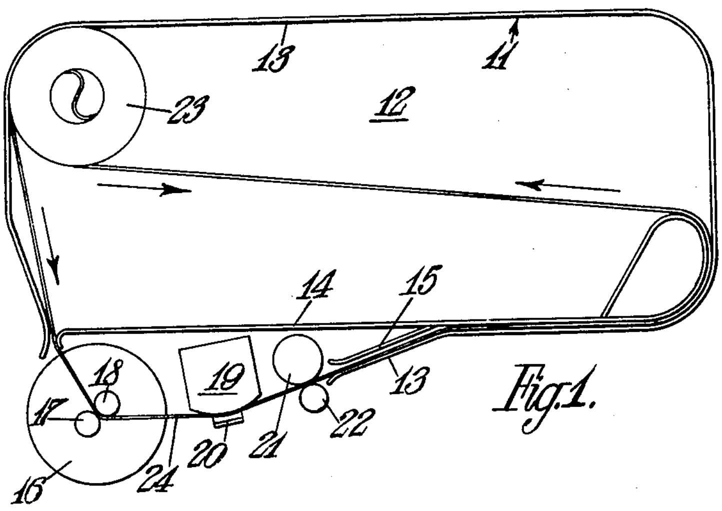
FIGURE 1 is a plan view showing the essential parts of a tape recorder according to the invention, with a coiled band of tape in position in the magazine.

Referring to FIGURE 1, the tape recorder comprises a magazine generally indicated by reference 11 which may conveniently be fabricated from sheet metal. It has a base 12 and side walls built up of the strips 13, 14 and 15, and it is closed by a lid which is not shown. The strip 13 forms three of the side walls and a part of the fourth and it is formed with a lip at each end to enable the tape to pass without fouling the edge at either end. The strip 14 forms a part of the fourth side wall and it will be observed that it is arranged parallel to the strip 13 for a part of its length, round one of the bends forming a corner of the magazine, and the end which is inside the magazine is bent back upon itself so that there is no projection on which a loop of tape might be entangled when the tape is unwound. The strip 15 is also arranged parallel to a part of the strip 13, thus forming a channel through which tape may pass into the magazine. The free end of the strip 14 is formed with a lip so that tape may pass without fouling the edge, and an opening is formed between this end of the strip 14 and the adjacent end of the strip 13 through which tape may pass out of the magazine.

Adjacent the opening formed by the ends of the strips 13 and 14 is a rewinding device comprising a circular flange 16 with two parallel pins 17 and 18 projecting from the face of the flange, and normal thereto, spaced at diametrically opposite points from the centre of the flange. The flange is rotatable about its centre and a latch or the like may be provided to enable the flange to be locked in the position shown, in which the tape may pass freely between the two pins 17 and 18.

Adjacent the flange 16 is a magnetic head 19 which may be used for recording upon a magnetic tape or for reproducing or playing back from a magnetic record previously impressed upon the tape, in a manner already well known. The magnetic head may be a combination head including erasing means. A pressure pad 20, which may be of the conventional type, is adapted to press the tape lightly into contact with the magnetic head.

Between the magnetic head 19 and the entrance to the magazine formed by the ends of the strips 13 and 15 is a capstan 21 which is driven by suitable means, such as an electric motor (not shown) at a constant speed. A pinch-roller 22 is arranged in the conventional manner to press the tape into frictional contact with the capstan.

To use the tape recorder the lid of the magazine is opened and an endless band of tape previously wound in a double spiral into a coil 23 is placed loosely in the magazine, the lid being closed after a loop of tape, 24, has been passed through the opening formed between the ends of the strips 13 and 14, between the pins 17 and 18, between the magnetic head 19 and the pressure pad 20, between the capstan 21 and the pinch roller 22 and into the channel leading back to the magazine. The motor or its equivalent is then started and the loop of tape 24 is drawn from the magazine, between the pins, past the magnetic head and is fed back into the magazine by the capstan 21. During this movement of the loop 24 the tape inside the magazine is moving in three directions, as indicated by the three arrows in FIGURE 1. The coil 23 is thus unwounded while recording or playback is in progress and the tape is distributed within the magazine in loose meandering loops. This final condition is shown in FIGURE 2, which also illustrates a modification of the arrangement of the parts external to the magazine.

Figures 2, 3:
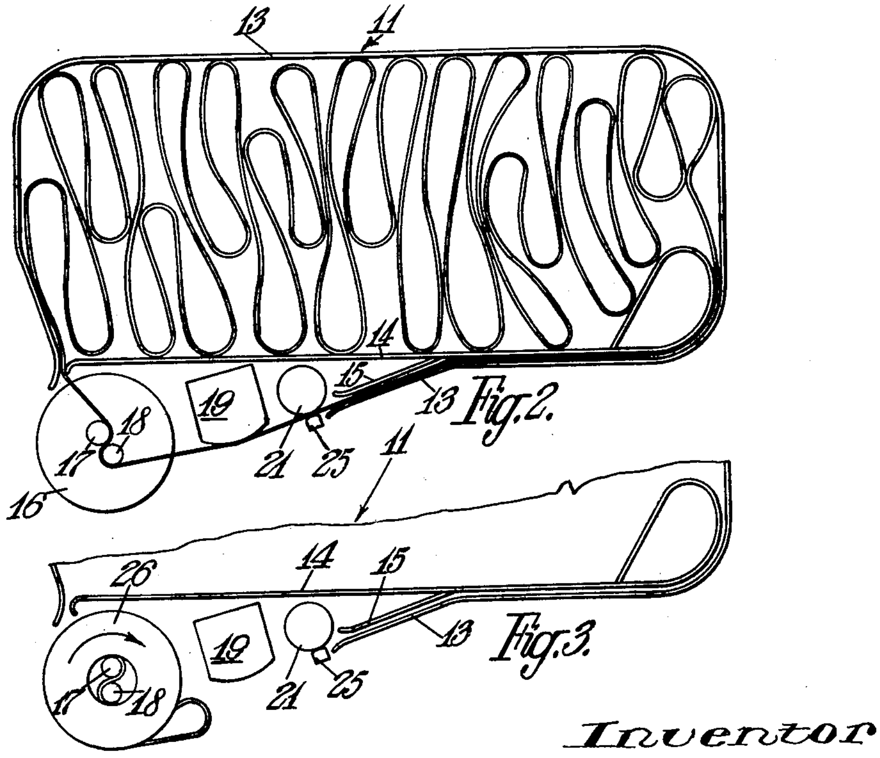
FIGURE 2 is a similar view of the tape recorder after the tape has been unwound inside the magazine.
FIGURE 3 is a partial plan view showing a part of the tape recorder after the tape has been wound on to a tape rewinding device.

Referring to FIGURE 2, the flange 16 is placed in a different rotational position so that the tape, in moving from the magazine to the recording head, must follow a somewhat tortuous path and, due to friction, sufficient tension is provided to keep the tape in contact with the magnetic head. The pressure pad 20 is therefore dispensed with. The pinch-roller 22 has also been replaced by a pressure pad 25, made of a material which has a very low coefficient of friction, for example, nylon or polytetrafluoroethylene. It will be understood that suitable resilient means are provided to press the pad 25 against the pinch roller and the pad may also be pivoted transversely to ensure even pressure along the length of the capstan.

When the band of tape is to be removed the flange 16 is rotated by hand in the direction of the arrow in FIGURE 3, when the band is wound in a double spiral around the pins 17 and 18 to form a new coil 26. This may be removed after lifting the lid of the magazine to release the last loop of tape, leaving the flange 16 and the two pins in position on the tape recorder.

Figure 4:
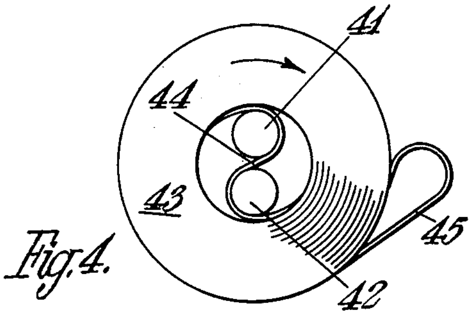
FIGURE 4 is a plan view of the rewinding device according to the invention with a coil of tape wound thereon.
Figure 5:
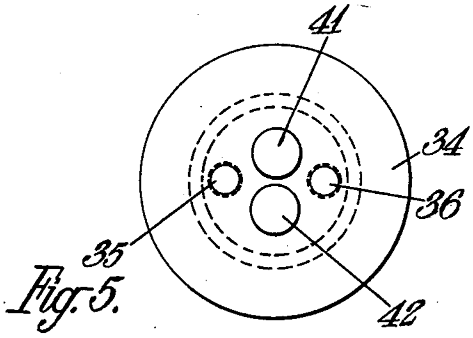
FIGURE 5 is a plan view of the device of FIGURE 4 after removal of the coil.
Figure 6:
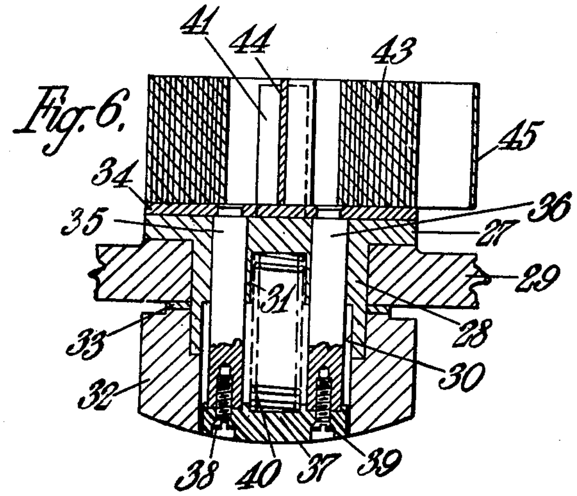
FIGURE 6 is a vertical section of the device of FIGURES 4 and 5.

Referring to FIGURES 4, 5 and 6 a stripping device which may replace the rewinding arrangement of FIGURES 1 to 3, comprises a member having a flange 27 with a co-axial shaft portion 28 extending downwardly therefrom rotatable in a mating bore in the structure 29 of the tape recorder. The lower end of the shaft portion 28 is bored out to form a recess 30 and from the inner face of this recess a further blind bore of smaller diameter, 31, extends inwardly for a further distance. A knob 32 is located upon and fixed to the lower end of the shaft portion 28, a washer 33 being interposed between the face of the knob and the structure 29. Washers 33 of different thicknesses may be provided, the washer selected having the appropriate thickness to prevent undesirable end play between the parts.

A stripper 34 is in the form of a circular plate having a diameter equal to that of the flange portion 27 and has two guide pins 35 and 36 secured to its underside by any appropriate means, for example, riveting. The guide pins 35 and 36 are slidable axially in corresponding bores through the flange portion 27 and the shaft portion 28. A cap 37, which may conveniently be a plastic moulding, is located on the ends of guide pins 35 and 36 by means of recesses and attached by means of two screws 38 and 39. A spring 40, located in the bore 31 and in a central recess in the cap 37, urges the cap outwardly. By pressing on the cap 37 the plate 34 is moved axially away from the flange portion 27 against the pressure of the spring 40 until the inner end of the cap abuts the inner end of the recess 30. The knob 32 is bored to the same diameter as this recess.

Two parallel pins 41 and 42 are fixed at diametrically opposite points to the flange portion 27, projecting from the face thereof with their axes parallel to the axis of rotation. The plate 34 is provided with two clearance holes through which these pins may pass.

When an endless band of tape is to be inserted it is placed in the magazine and a loop of tape is brought out through two openings in the side walls thereof and threaded into the mechanism of the recorder as previously described. During this process it is passed between the pins 41 and 42.

While recording or playback is in progress the rewinding device is stationary and the tape merely passes between the pins. As already described, the rewinding device may be held in a desired position by means of a latch. Such a latch could be arranged to engage a slot in the periphery of the flange portion 27. When it is desired to remove the band of tape from the recorder the latch, if present, is released and the rewinding device is manually rotated by means of the knob 32 in the direction of the arrow in FIGURE 4 until the whole length of the band has been wound in a double spiral about the pins 41 and 42, the last loop of tape being released from the magazine and the recorder mechanism to complete the coil. The completed coil 43 is shown in FIGURE 4, the inner end 44 of the band being entwined with the pins and the outer end 45 being in the form of a free loop. When the coil is ready for removal the cap 37 is pressed inwardly and the coil 43 is pushed away from the flange portion and out of engagement with the pins. Preferably the upward movement of the plate 34 is so restricted that the coil remains in position near the tops of the pins so that it may be lifted off with the fingers.

It will be evident that the invention makes it possible to construct a tape recorder which is exceptionally small and compact and is suitable for use as a pocket recorder. By using a transistor amplifier and a small loud speaker it is possible to provide a small self-contained unit which may be carried in the pocket in the same way as the conventional hearing-aid and may be used to record thoughts and ideas, to dictate letters and memoranda, and for other purposes.

I claim:

1. A tape recorder for use with magnetic tape in the form of an endless band comprising a magazine in which said tape is accommodated in irregular meandering loops without folds, said magazine having two spaced openings in its side through which a loop of said tape is brought to the outside of said magazine, a magnetic head, a single capstan adapted to draw said tape from one of said openings past said magnetic head and to feed it back through the other of said openings, a rewinding device immediately adjacent said one of said openings having a circular flange rotatable about its centre, two pins projecting from a face of said flange and normal thereto, said tape being traversed between said two pins for recording and reproducing and wound around said pins for rewinding into a coil, manual means for rotating said rewinding device, a stripper including a circular plate having the same diameter as said flange normally lying against the face of said flange and movable therefrom in the axial direction to remove a coil of tape wound around said pins, spring means to urge said plate against said face of said flange, and a push button incorporated in said manual rotating means to move said plate away from said flange against the action of said spring means.

2. A tape recorder as claimed in claim 1 comprising means to lock said rewinding device in such a position that said tape passes freely between said pins.

3. A tape recorder as claimed in claim 1 comprising means to lock said rewinding device in such a position that said tape follows a tortuous path around said pins to provide a desired degree of tension in the portion of said tape outside said magazine.

References Cited in the file of this patent

UNITED STATES PATENTS

| | | |
|---|---|---|
| 431,794 | Anderson | July 8, 1890 |
| 1,823,245 | Wittel | Sept. 15, 1931 |
| 2,679,394 | Lear | May 25, 1954 |
| 2,742,284 | Munroe | Apr. 17, 1956 |

FOREIGN PATENTS

| | | |
|---|---|---|
| 67,481 | France | Oct. 7, 1957 |
| | (Addition to No. 1,106,477) | |